US007779161B2

(12) United States Patent
Buchs et al.

(10) Patent No.: US 7,779,161 B2
(45) Date of Patent: Aug. 17, 2010

(54) METHOD AND APPARATUS FOR GENERAL VIRTUAL APPLICATION ENABLING OF WEBSITES

(75) Inventors: Francois Buchs, Pompano Beach, FL (US); Zijad F. Aganovic, Delray Beach, FL (US)

(73) Assignee: Hiconversion, Inc., Boca Raton, FL (US)

( * ) Notice: Subject to any disclaimer, the term of this patent is extended or adjusted under 35 U.S.C. 154(b) by 340 days.

(21) Appl. No.: 11/880,822

(22) Filed: Jul. 24, 2007

(65) Prior Publication Data

US 2009/0031228 A1     Jan. 29, 2009

(51) Int. Cl.
*G06F 15/16*     (2006.01)

(52) U.S. Cl. .................................. 709/246; 715/764
(58) Field of Classification Search .................. 709/246
See application file for complete search history.

(56) References Cited

U.S. PATENT DOCUMENTS

| 2004/0215719 | A1* | 10/2004 | Altshuler | 709/204 |
| 2007/0067297 | A1* | 3/2007 | Kublickis | 707/9 |

* cited by examiner

*Primary Examiner*—Wing F Chan
*Assistant Examiner*—Andrew Woo
(74) *Attorney, Agent, or Firm*—Gregory P. Gadson

(57) ABSTRACT

A novel method of virtual application enabling of a web site at least includes: a) via a end-user device, connecting to a website targeted for application enabling; b) generating end-user device compliant code for rendering of a web page on the end-user device; c) rendering a web page on the end-user device; d) providing locations on a rendered web page designated for virtual website application enabling; e) automatically mapping locations selected in element d) into corresponding locations in the end-user or website source code; f) providing application enabling code to be inserted at the locations identified in element e) or other general website code locations; g) generating and managing a virtual application enabling setup package adapted to store application enabling information generated in elements d), e), and f); and h) virtually (i.e., just in time) generating the application enabled end-user code in accordance with the information and directions contained in the application enabling setup package.

23 Claims, 8 Drawing Sheets

PRIOR ART

METHOD AND APPARATUS FOR GENERAL VIRTUAL APPLICATION ENABLING OF WEBSITES

BACKGROUND OF THE INVENTION

1. Field of the Invention

The present invention relates to schemes for modifying and expanding the functionality of websites.

2. Background

Third party software applications or add-ons have been developed to enhance website functionality and enhance website management. To deploy such third party applications it is necessary to integrate the website with the applications by placing additional lines of code into the website source code. The process of integrating (or linking) third party software applications with a website may be thought of as "application enabling" of the website.

In today's online commerce and technology environments, there is a great need for application enabling of websites in a non-programming manner, to enable the reuse of third party developed, specialized components that will increase the capabilities and efficiencies of websites, while at the same time reducing the development cost and time needed for implementation.

Some examples of third party web applications include website optimization solutions, web analytics, advertisement, and web content management solutions that enable more effective website management. Similarly, there are reusable components that enable shopping cart functionality, news section management, and other website functionalities that may be handled by third party web applications.

Prior art approaches to application enabling of websites include manual source code changes in conjunction with third party software installation, proxy server based enabling, and automated source code changes as further described below.

Application enabling by manual source code change involves inserting additional lines of code into website source code, which additional lines initialize the execution of the third party applications. This requires a breadth of technical and programming language knowledge, thereby limiting the distribution and use of third party developed web applications to a relatively small number of organizations that have know-how and operational setup needed to effectively carry out such projects. The main difficulties of this approach stem form website source code being often poorly documented, as well as poorly structured, so that even seasoned website programmers may have difficulty creating modifications. Even where appropriately qualified individuals are involved in the website modification process, the tedious nature of the exercise can lead to errors and mistakes, and is also time-consuming.

Application enabling by proxy server for the website optimization and visitor tracking is described in U.S. Patent Application Publication No. 20060271671A1, for example. In that reference, the website optimization application is executed through a modification module that changes website content and tracks website visitors' behavior. This method replaces the complexity of the website source code manipulation in the manual approach with another complicated task of creating ("wiring") the modification module. Further, the method also requires the involvement of skilled technical resources, creating another impediment to mass adoption.

Another approach for website application enabling is discussed in U.S. patent application Ser. No. 11/729,569 filed Mar. 29, 2007 by Buchs, et al., and assigned to Hiconversion, Inc., the assignee of the present letters patent, for "Method and Apparatus for Application Enabling of Websites." This approach automates the process of source code changes through the use of visual tools that have the ability to acquire end-user input about location on the live web page, and the type of functionality that will be added to that location. It further has the ability to merge that input with the third party installation code that will be inserted into the website source code for application enabling. Also, this approach eliminates technical complexity, and makes it possible for a great number of organizations to take the advantage of third party web applications.

SUMMARY OF THE INVENTION

The invention is a new method and system that enables web operators to application enable their website without the need to perform website source code manipulation. The key aspect of the present-inventive approach is the ability to completely abstract or virtualize the website application enabling data set with the associated capability to perform "just in time" website application enabling when a web page is requested by an end-user device. This general virtual application enabling approach is very flexible, as it supports simultaneous enabling of multiple applications with the freedom to perform the just in time application enabling action either on the end user side (end-user device) or on the server side (such as web server, proxy server, etc.).

A method and system are provided for using live website pages in combination with a graphical user interface (GUI) during the application enabling setup process. This enables a non-technical user to define the particular locations on the website where the application enabling will occur, and also to specify the enabling functionality to be performed in accordance with the third party application characteristics and specifications. An application enabling setup package is generated at the end of the setup phase.

The website application enabling is performed by an enabling module in combination with application specific enabling agents and an enabling setup package file. The enabling agents can execute-either on the end-user side or on the server side (web server, proxy server, etc.). The actual enabling can be performed virtually without changes in the website source code, or alternatively in "real" manner through automatic manipulations of the website source code.

The innovative method and system leverages visual input information provided by the user, and maps that information to the end user or website source code elements and locations. As result, the present-inventive method and system enable virtual (i.e., just in time) code manipulation in accordance with end-user input and specific application requirements. Once implemented, the present invention provides web operators with the ability to add, change, or remove web applications without the need to disturb the existing website setup or source code.

The present invention provides a novel method of application enabling of a web page that at least includes: a) via a end-user device, connecting to a website targeted for application enabling; b) generating end-user device compliant code for rendering of a web page on the end-user device; c) rendering a web page on the end-user device; d) providing locations on a rendered web page designated for virtual website application enabling; e) automatically mapping locations selected in element d) into corresponding locations in the end-user or website source code; f) providing application enabling code to be inserted at the locations identified in element e) or other general website code locations; g) generating and managing a virtual application enabling setup package adapted to store application enabling information generated in elements d), e), and f); and h) virtually (i.e., just in time) generating the application enabled end-user code in accordance with the information and directions contained in the application enabling setup package.

The present invention also provides a system for virtual application enabling of a web page that at least includes: an end-user device, adapted to connect to a website targeted for application enabling, and to render a web page associated with the website; a graphical user interface (GUI), adapted to provide visual location or component selection on a rendered web page; a code mapper, adapted to automatically map locations selected by the GUI into corresponding locations in the end-user code or website source code; a setup agent adapted to generate a virtual application enabling setup package, the virtual application enabling setup package at least including application enabling instructions, programming code, and data; and a just-in-time end-user code generator adapted to generate application enabled end-user code.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

Figure 1:
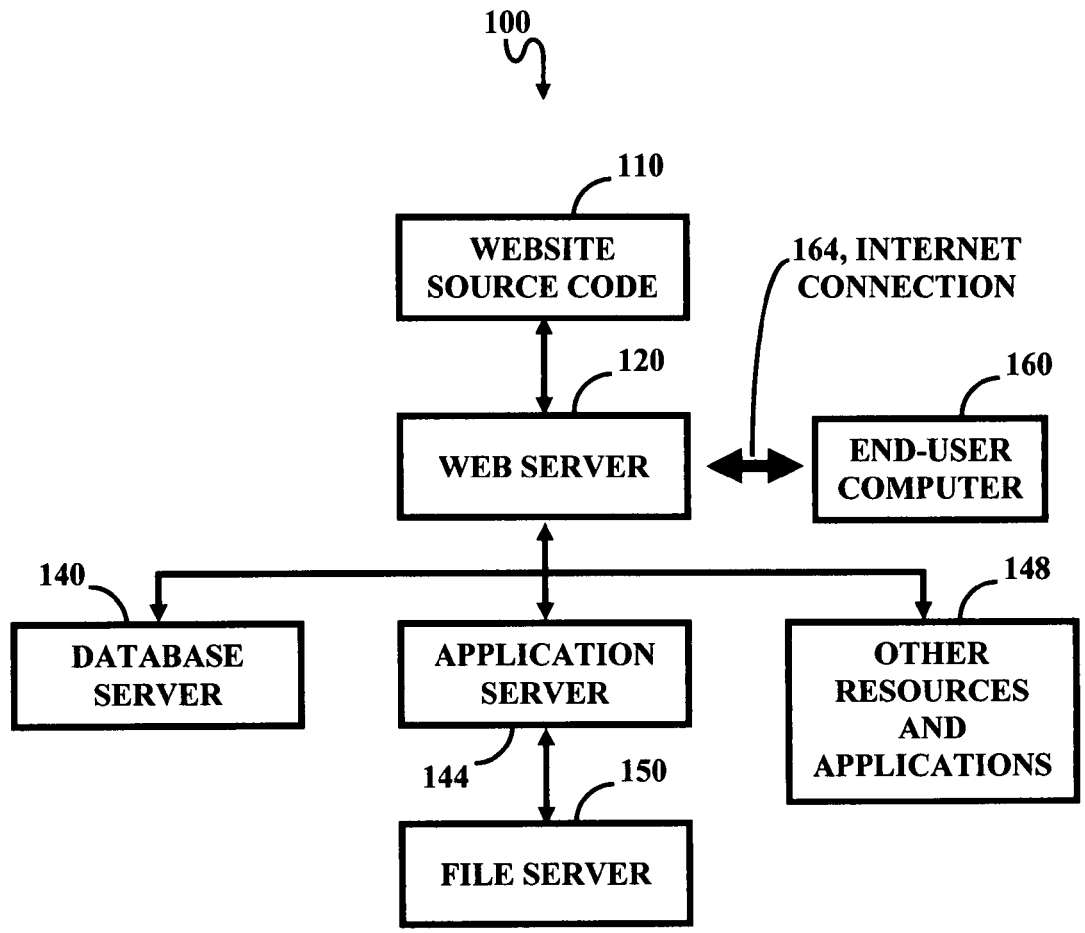
FIG. 1 is a schematic diagram of a prior art system for web page delivery and rendering on an end-user device.

FIG. 1 illustrates the general architecture of a system 100 capable of delivering web pages through interaction with an end-user web browser. The website and the associated web pages are formed by executing website source code represented by the number 110, as will be appreciated by those skilled in the art. A web server 120 runs the website code 110 using one or more operating systems, which may include such popular operating systems as Linux®, Unix®, Windows®, Vista®, and others.

The system includes additional servers necessary for carrying out the website functions, including for example, a database server 140, an application server 144, a file server 150, and other resources and applications symbolically represented by the number 148. Each one of the servers can use a different operating system. In accordance with World Wide Web protocols, one or more end-user computers or devices 160 are used to access the website via an Internet connection 164. A web browser which may be installed on the device 160 allows web pages to be viewed by a user upon being rendered by the browser.

A process of web page rendering for viewing in the end-user web browser is further described with reference to FIG. 2. The website server 220 transforms the website source code 110 into a corresponding end-user code 270 which complies with web browser requirements. The source code 110 may comprise several components programmed in different programming languages. Such programming languages include, but are not limited to, JAVA, Hypertext Markup Language (HTML), JSP, ASP, PHP, PYTHON, and many others. These components provide the desired website functionality through the use of the system described in FIG. 1.

After the transformation by the web server, end user code that complies with World Wide Web conventions might have some components that are exactly the same, while other components may look significantly different than the website source code. For example, the components 2 and 4 (214 and 218) of the source code which are written in HTML, remain in HTML in the end-user code as the corresponding components 2 and 4 (274 and 278). However, the browser in the example is incapable of executing code written in PYTHON, which is why the web server will process PYTHON code and transform a component 3 (216) of the source code to, for example, browser readable content in the end-user code (new component 3, numbered 276). Similarly, the component 5 (219) written in Server JAVA language is also converted to browser readable HTML content (new component 5, numbered 279).

Figure 2:
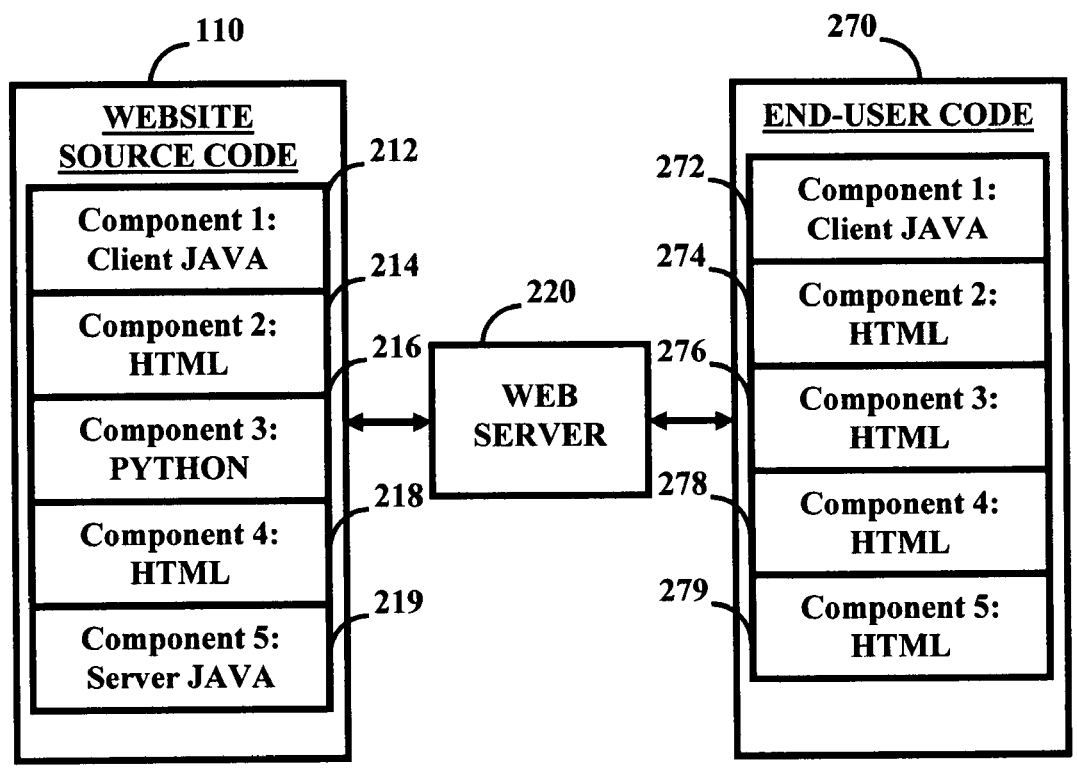
FIG. 2 is schematic diagram of an example of browser-compliant end-user code generated in response to an end-user request to view a selected web page.

The web server can successfully perform transformation of the source code for the purpose of rendering of a web page in the end-user web browser described in FIG. 2 only in concert with the entire system described in the FIG. 2. If any system component is missing, the web page might not render correctly, if at all. Therefore, for any visual application enabling method to work, the access to a correctly rendered web page is essential. The system described in the FIG. 1 can be replicated on a case by case basis, but this is not practical or economical in any mass web application enabling scenario.

Any change to the website source code requires republishing of the code on the web server. Since multiple individuals may be involved in the process, and assuming that a particular application such as web analytics requires frequent changes, a complicated operational situation can arise with considerable delays and lost time.

Figure 3:
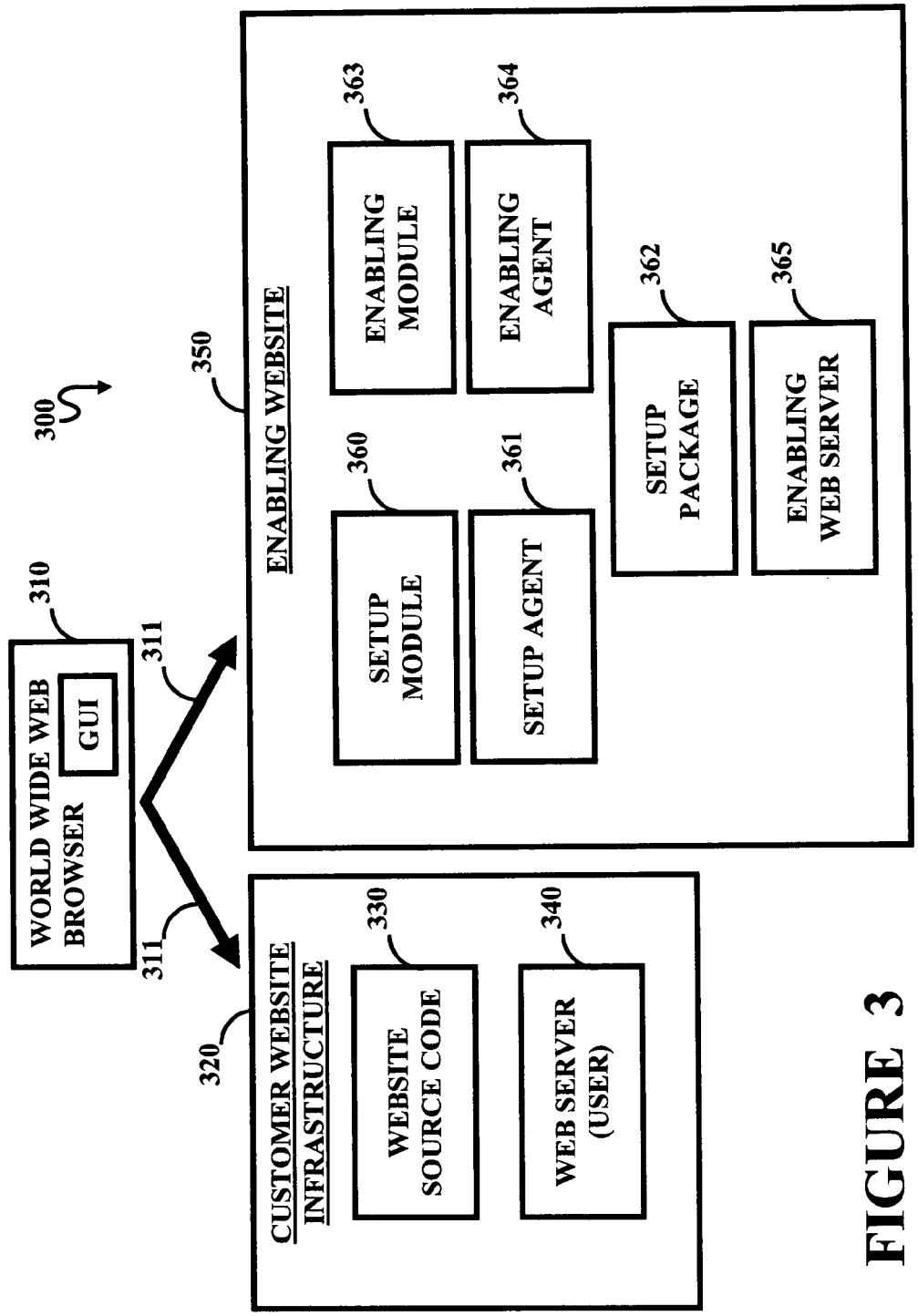
FIG. 3 is a general diagram of the present-inventive virtual web application enabling system.

In accordance with the present-inventive system 300 as illustrated by FIG. 3, one or more end-user computers or devices 310 are used to modify the functionality of a website via an Internet connection 311.

The present-inventive website application enabling method and system can be carried out via an application enabling solution directly installed on a customer website end-user server 340, or alternatively, the method and system can be carried out using an application service provider (ASP) approach. The application enabling solution may even be provisioned to use the end-user device in the implementation process.

The important feature of the present invention is the ability of end-users to perform application enabling setup steps through a visual graphical user interface (GUI) that renders a current live web page which has been delivered via a customer's website infrastructure 320. A setup enabling module 360, which is shown as part of an enabling website 350 in the example, activates a visual editing GUI on the end-user web browser 310. The GUI allows the end-user to navigate the web page rendered on the end-user computer, and further allows the end-user to perform web application enabling and selections in a "what you see is what you get" fashion, without direct access or knowledge of the programming source code or requirements of a specific application being enabled on the website. In addition the GUI enables the end-user to perform application enabling of specific configuration and provisioning actions. For website optimization applications, as an example, the same GUI interface can be used to create or edit new section variations that will participate in the optimization experiment.

The present invention also includes a setup agent 361, which is a computer application containing application-specific setup requirements and information, such as the installation options, and scripts needed for insertion into the website source code (symbolically numbered 330) to enable that specific application on the website, etc.

The selections and actions made by the end-user are automatically recorded and saved in a setup package module 362, which encapsulates all application enabling settings, and in essence creates a virtual abstraction of the enabling requirements. For example, the end-user can perform application enabling of a web page by highlighting (tagging) in some fashion, the portion of the rendered web page where application enabling will be physically applied. A "mouse" or other pointing device can be used for highlighting, and other highlighting approaches can also be used, such as "pop-up" displays. The term "visual tagging" is used here to denote that the web page locations of interest are "tagged" and made visible to the user and the corresponding locations of the end user code are automatically recorded.

Another critical feature of the invention is virtual (i.e., just in time) application enabling performed by an enabling module 363. The enabling module 363 utilizes the functions of one or more enabling agents 364 and a setup package 362 which is performed through an enabling module 363, which enabling module uses one or more enabling agents 364 and a setup package 362. The specific details of the virtual enabling process will be further described infra, with reference to FIGS. 5-7.

The enabling agents can be application specific, or a combination that supports enabling of multiple web applications. For example, one can imagine a Google™ AdWords® enabling agent that simultaneously supports enabling of both Website Analytics and Website Optimizer applications. The actual enabling can be executed on either the client side or the server (e.g., enabling web server 365) side.

Figure 4:
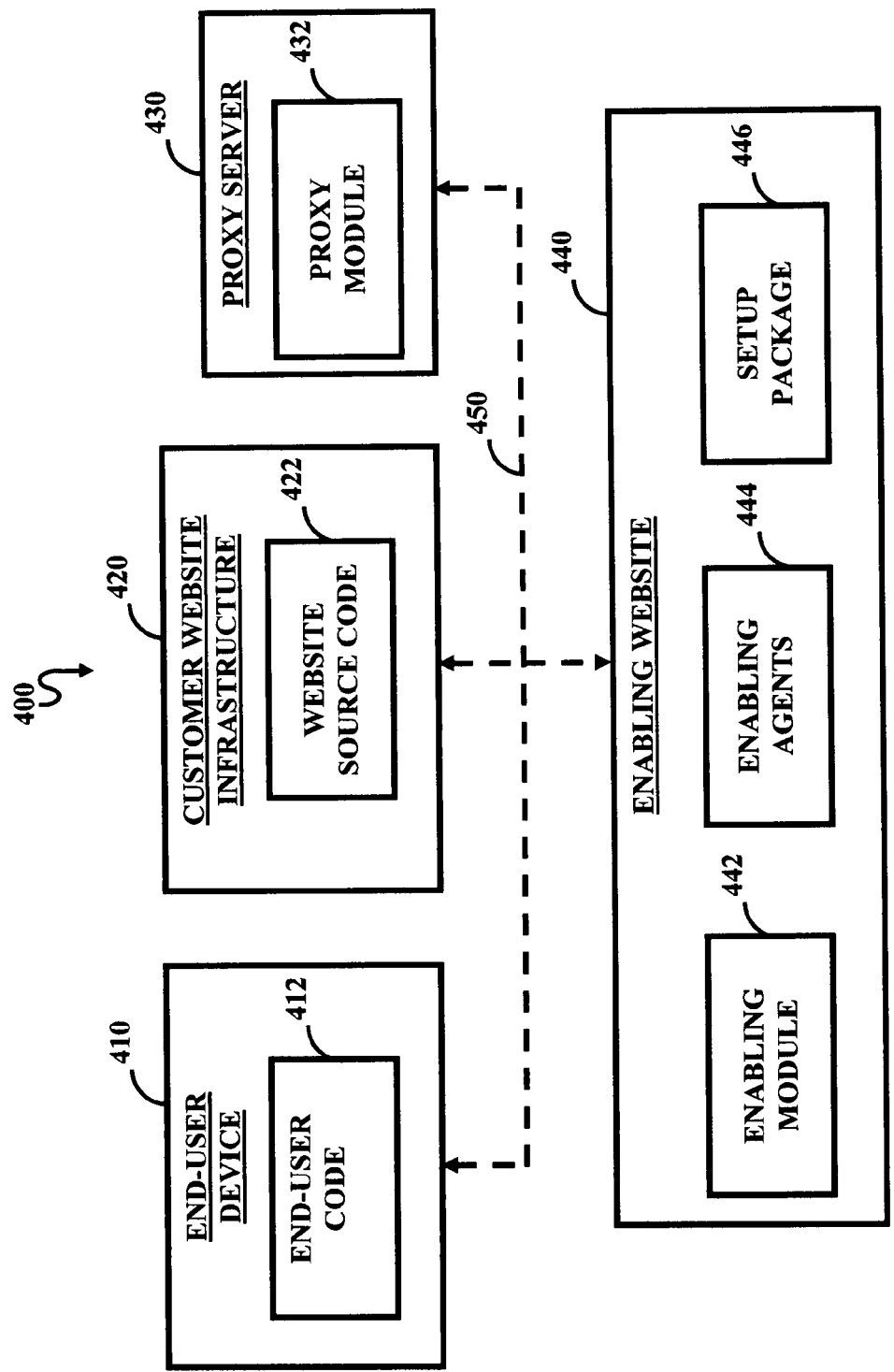
FIG. 4 is an alternate embodiment of the present-inventive virtual web application enabling system.

FIG. 4 further describes possible virtual application enabling implementation embodiments. The virtual website application enabling can be performed on the end-user device 410, a website server 420, or on the proxy server 430. The actual application enabling is performed from the enabling website 440 via a communication link 450. As previously mentioned, there are many possible implementation combinations that might place different enabling elements within the end-user website infrastructure or service provider infrastructure. The communication link is represented by a dotted line in the figure to illustrate the temporary nature of the application enabling procedure.

If application enabling is performed via the end-user device 410, then during the preparation for rendering of the end user code 412, a call to the enabling module 442 is made. Based on the unique web page identification and associated enabling setup package 446 (in case of multiple applications it will be multiple packages) the enabling module activates one or more of the enabling agents 444 that will in turn execute virtual web application enabling.

Similarly, if the application enabling is performed on the web server side, the web server will, during the website source code processing, make a call to the enabling module that initializes virtual application enabling. In both cases (i.e., end-user device or server side enabling) the link or call to the application enabling module is made possible via a program placed into website source code during the one time setup procedure. It is critical to note that this one time setup provides a generic, non-application specific website application enabling capability. This one time intervention will enable all future virtual application enabling by many different applications performed in many different locations of a website.

Website application enabling on the proxy server 430 eliminates a need for the initial setup and additional program lines into the website source code. Instead, the proxy module 432 activates the enabling module, and based on the web page identity, activates the appropriate application enabling processes.

Figure 5:
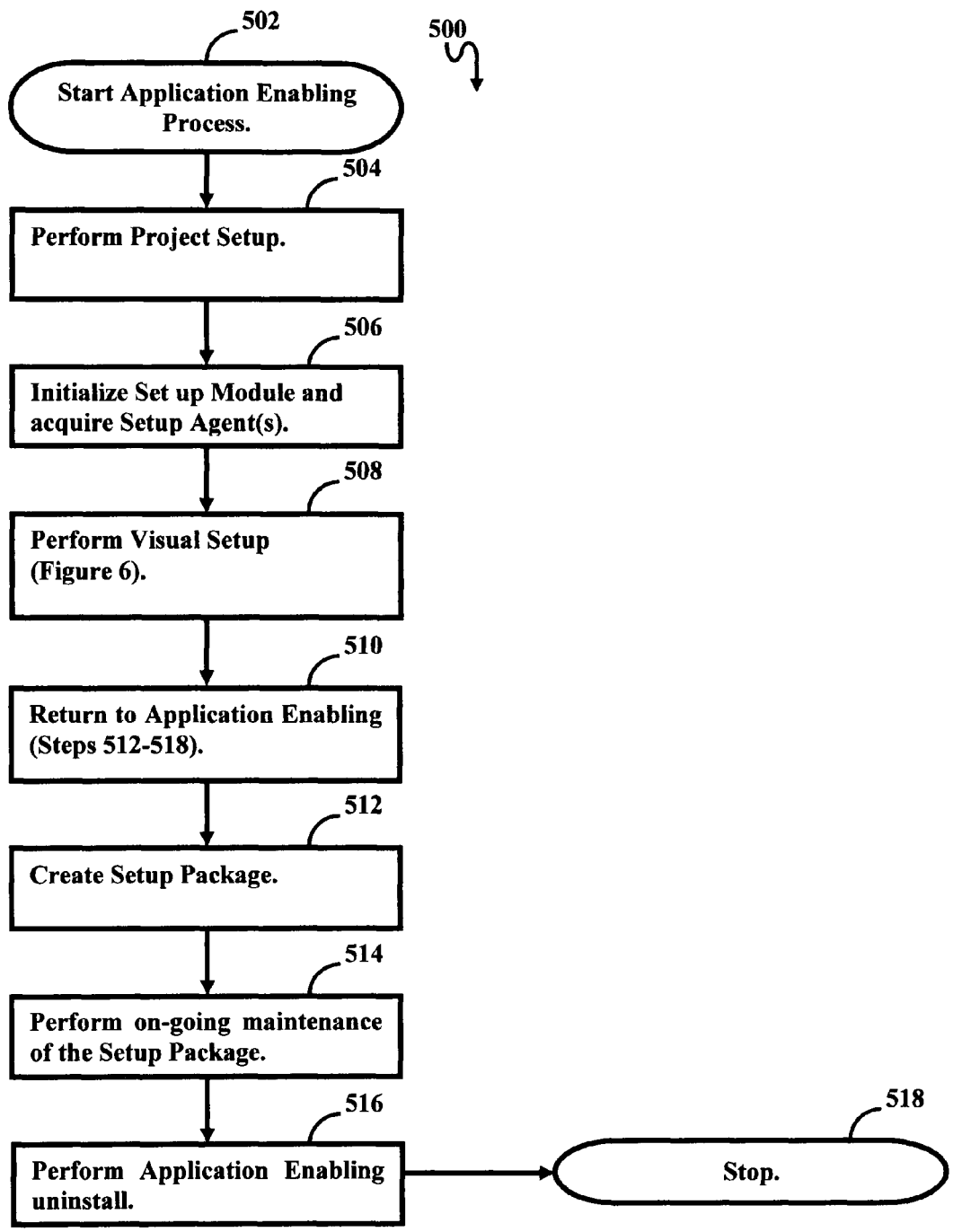
FIG. 5 is a flowchart illustrating one possible approach to a third party website application enabling setup process.

The setup process 500 of the present-inventive website virtual application enabling method is illustrated in FIG. 5. In the example given, the application enabling setup process is used to create setup information necessary to enable a website optimization solution. Recall that this method is not limited to website optimization solutions, but is also applicable to many other website applications.

As shown in FIG. 5, the website application enabling process 500 begins with Step 502, followed by the project setup (Step 504). In the latter step, the end-user defines the identity, scope, and participants in the web application enabling project. For example, in a website analytics case, the end-user can name the website optimization experiment, define the pages, sections, variations, and goals associated with the experiment, and define contributors to this project, such as the designer, manager, etc. This step also generically includes security and authorization to ensure that website optimization is performed only by those who have been granted system access.

The setup module is initialized and the setup agent is acquired in Step 506. The setup module is generic and applicable to every setup project, but the agents are application specific. Each agent contains the application specific setup information, requirements, and application enabling code that will be used in the visual setup step (508). For example, in the case of the setup agent that supports Google's Website Optimizer, the agent requires the end user to define sections, enter variations, and define conversion goals.

Figure 6:
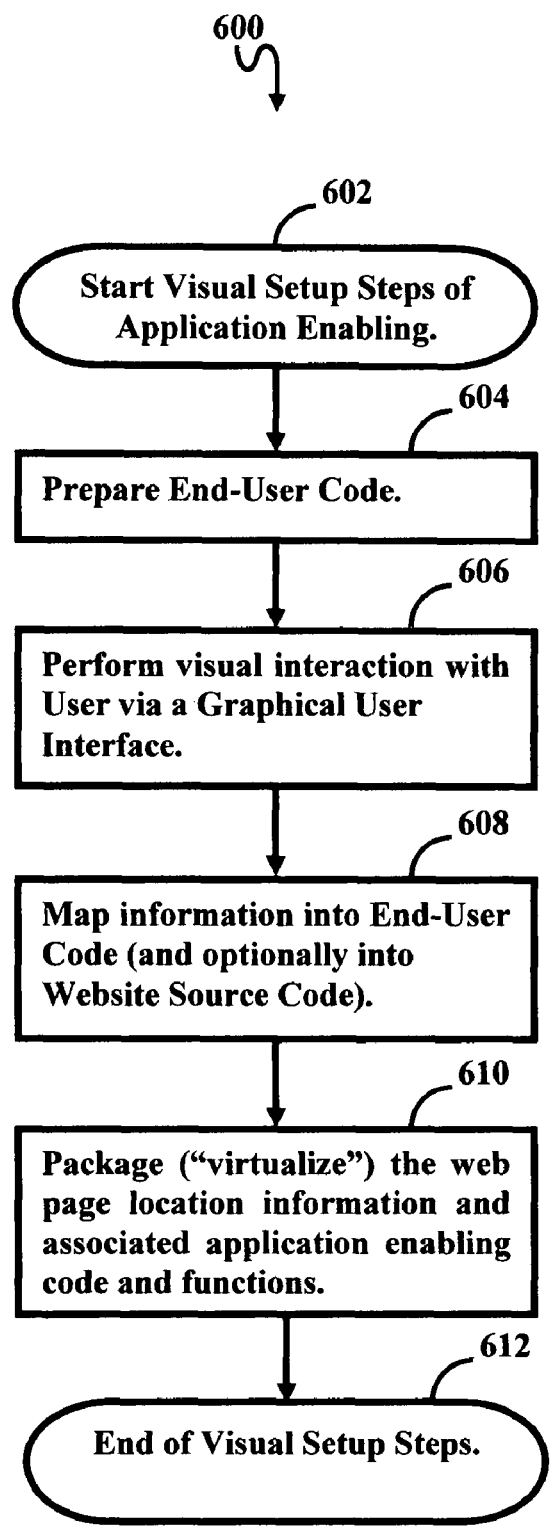
FIG. 6 is a flowchart illustrating one possible process for the virtual application enabling of a website.

Beginning with Step 508, the visual setup steps of the application enabling process are performed, as more fully illustrated in FIG. 6.

Turning to FIG. 6, the first step in the visual setup process after the start (602) is to prepare the end-user code (Step 604). In this step the program launches an end-user device browser session with the rendered web page in conjunction with a graphical user interface (GUI) application.

Visual interaction between the end-user and the rendered web page is performed in Step 606 via the GUI. The use of the GUI facilitates the user's visual identification of the areas or aspects of the web page that will participate in the web application enabling, together with application enabling functionality that will be placed in that area of the rendered web page.

The mapping step (608) acquires end-user visual GUI input and automatically identifies corresponding locations or areas of the end-user code that are selected for participation in the application enabling. If necessary, the mapping process will expand into identifying locations and areas in the website source code that are selected to participate in the application enabling. The mapping between end-user code and website source code, as described in FIG. 2, is a non-trivial exercise which can be accomplished via specialized algorithms that are not part of the description of this Letters Patent. Also, the mapping results can be further processed by the GUI interface to identify areas of the web page that can be application enabled or areas of the web page that might have some application enabling issues, or not capable of being enabled.

In Step 610 the web page location information along with associated application enabling code and functions are packaged into a setup package designed to support the virtual enabling process. The setup package that supports the virtual application enabling process may be in the form of an accessible and modifiable stored file.

After the last step (612) of visual set up, the virtual application enabling process returns to the steps illustrated in FIG. 5, beginning with Step 510. Step 512 activates a setup package. If this is the first time that a virtualized application enabling process is used there might be a need for insertion of additional program code into website source code as described in connection with FIG. 4. Step 514 performs ongoing maintenance of the setup package in accordance with requirements dictated by the web application provider. Programs and third party applications that are no longer relevant or needed are uninstalled in Step 516. The process ends at Step 518.

Figure 7:
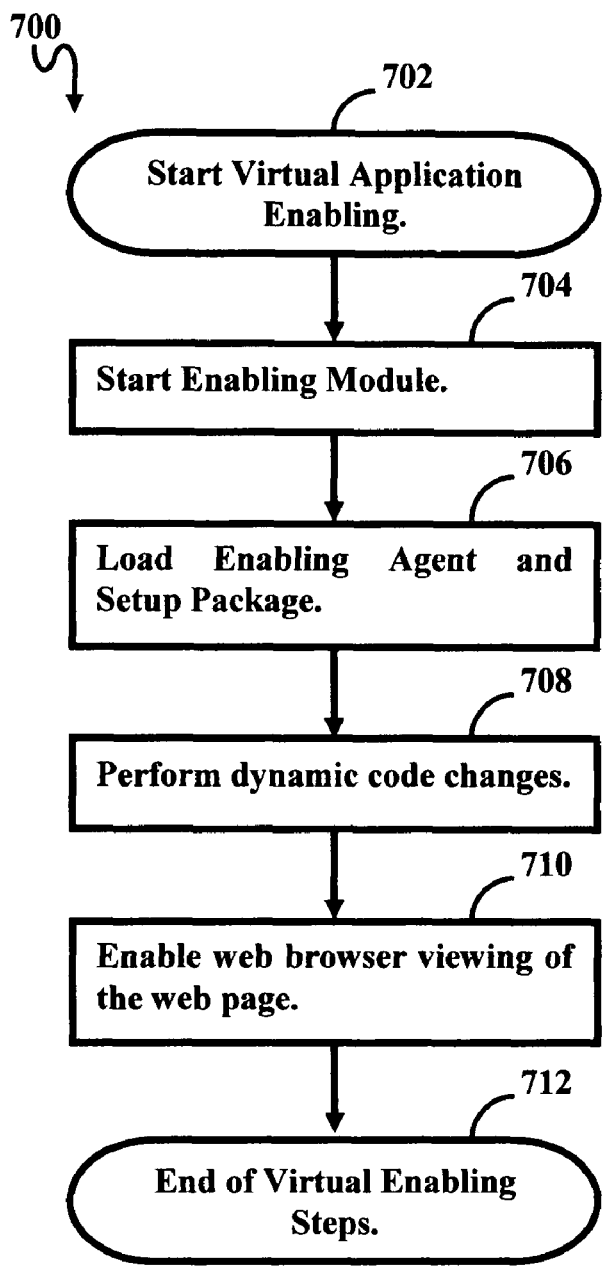
FIG. 7 is a more specific flowchart of a method adapted to carry out the present-inventive website virtual application enabling process.

The algorithm 700 in FIG. 7 summarizes the virtual application enabling process. After the beginning (Step 702) of the virtual application enabling process, the enabling module is started in Step 704. The enabling module assigns enabling agents and setup packages to a uniquely identified web page. Step 706 loads the enabling agents and setup package to a component that will actually execute the enabling action, as it was further described in connection with FIG. 4. In step 708 the enabling agent(s) perform virtual application enabling functionality and dynamically alter the end-user code. This modified code will be made available to the end-user device in the step 710. The virtual enabling process ends in step 712.

Figure 8:
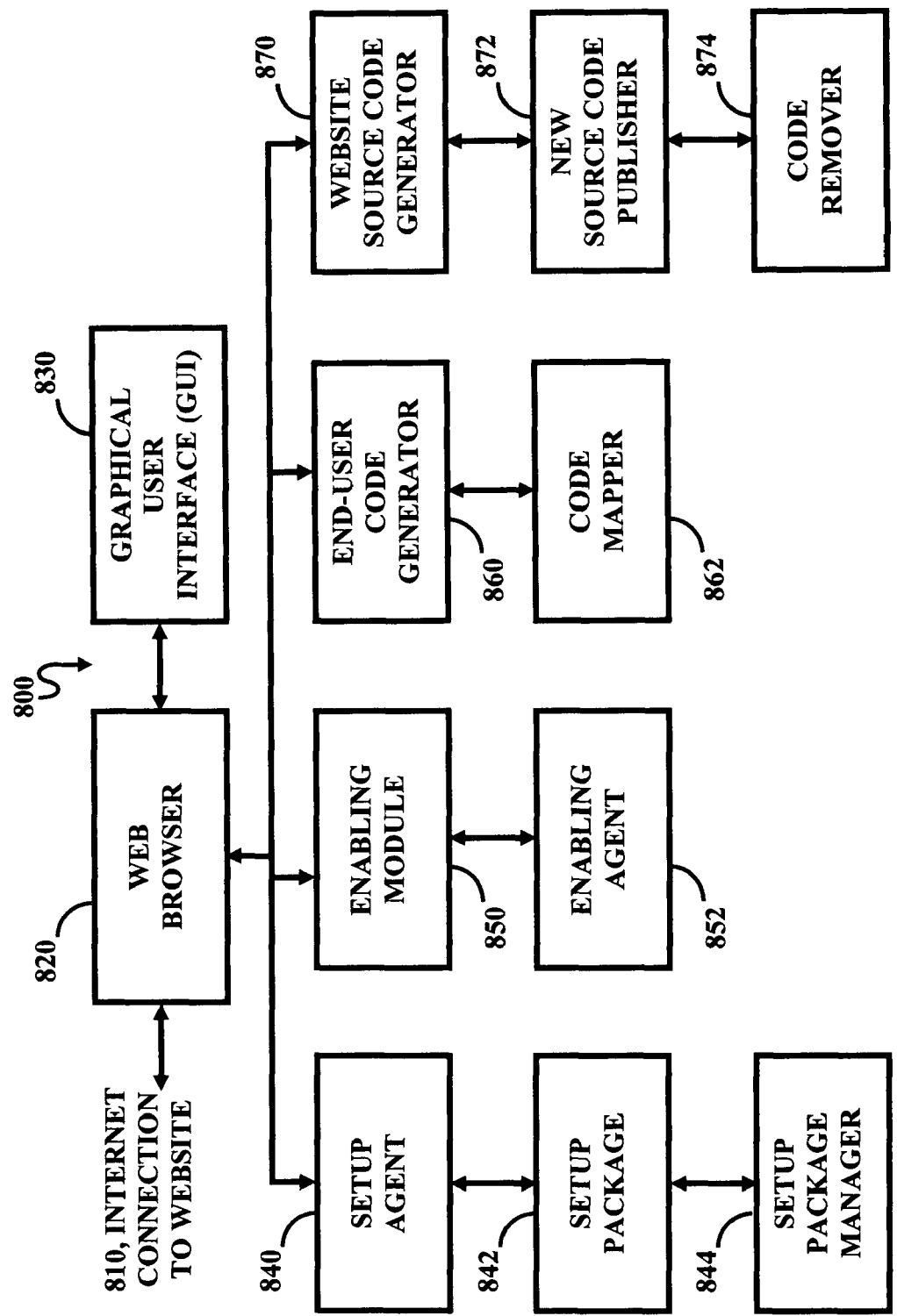
FIG. 8 is a schematic diagram of a general system capable of implementing the present-inventive website virtual application enabling process.

One embodiment 800 of a system capable of implementing the present-inventive website application enabling process is illustrated in FIG. 8. The system components may be in modular software form, with the exception of components such as an Internet connection labeled 810. These components may also be primarily included as part of a toolkit installed on the end-user computer or the end-user web server system. Alternatively, the primary components of the present-inventive website application enabling process can reside on third party owned computing infrastructure designed to provide on-demand web application enabling services through remote access for authorized end-users.

An end-user device 820 renders a web page based upon the information received from the website targeted by the web application enabling solution via the connection 810. A graphical user interface (GUI) 830 enables visual application enabling setup and maintenance. A setup agent 840 provides application specific setup actions and is designed to generate a setup package 844. The setup package is managed through its lifecycle via a setup package manager 846.

The application enabling is managed through an enabling module 850, which uses application specific enabling agents 852 and a setup package to virtually application enable a website. As result of the application enabling, a just-in-time code generator 860 generates a real-time version of the application enabled end-user code. Code generation is carried out via a code mapper 862.

A website source provider 870 is optionally employed if a user desires to make permanent application enabling changes in the website source code. This module enables import and code processing capabilities. Additionally, a new code publisher 872 and code remover 874 are used to perform automated publishing of the new source code, or removal of the application enabling code from the source code.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of virtual application enabling of a web site comprising:
    a) via an end-user device, connecting to a website targeted for application enabling;
    b) generating end-user device compliant code for rendering of a web page on said end-user device;
    c) rendering a web page on said end-user device;
    d) providing locations on a rendered web page designated for virtual website application enabling;
    e) automatically mapping locations selected in element d) into corresponding locations in the end-user or website source code;
    f) providing application enabling code to be inserted at the locations identified in element e) or other general website code locations;
    g) generating and managing a virtual application enabling setup package adapted to store application enabling information generated in elements d), e), and f); and
    h) virtually generating on demand, the application enabled end-user code in accordance with the information and directions contained in the application enabling setup package, automatically, without user intervention after initial set-up, each time said web page is requested, resulting in dynamic web page changes without the need for prior publishing of web page changes on the web server by the user;
    wherein said setup package can be automatically or manually edited to support a newer version of the targeted application or changes in the application enabling code.

2. The method of claim 1, further comprising:
    providing a graphical user interface (GUI) adapted to carry out element d).

3. The method of claim 2, wherein said GUI is further adapted to acquire the application enabling code of element f).

4. The method of claim 2, wherein said GUI is further adapted to manage application specific configuration options.

5. The method of claim 2, further comprising:
    via said GUI, indicating sections or aspects of the rendered web page available for functionality modification.

6. The method of claim 2, further comprising:
    via said GUI, indicating where application enabling modification is not appropriate or not possible.

7. The method of claim 1, wherein said virtual application enabling can be performed simultaneously for multiple applications.

8. The method of claim 1, wherein said setup package is adapted to support a plurality of applications.

9. The method of claim 1, wherein element f) is carried out via said end-user device.

10. The method of claim 1, wherein element f) is carried out via a web server.

11. The method of claim 1, wherein element f) is carried out via a proxy server.

12. The method of claim 1, further comprising:
inserting changes to application enabling code; and
publishing a new version of the application enabling code back to a web server.

13. The method of claim 1, further comprising:
automatically removing application enabling code from said website source code when said application enabling code is no longer appropriate or desired.

14. A system for virtual application enabling of a web page comprising:
an end-user device, adapted to connect to a website targeted for application enabling, and to render a web page associated with the website;
a graphical user interface (GUI), adapted to provide visual location or component selection on a rendered web page;
a code mapper, adapted to automatically map locations selected by said GUI into corresponding locations in the end-user code or website source code;
a setup agent adapted to generate a virtual application enabling setup package, said virtual application enabling setup package comprising application enabling instructions, programming code, and data; and
a virtual end-user code generator adapted to generate on demand, application enabled end-user code automatically, without user intervention after initial set-up, each time said web page is requested, resulting in dynamic web page changes without the need for prior publishing of web page changes on the web server by the user;
wherein said setup package can be automatically or manually edited to support a newer version of the targeted application or changes in the application enabling code.

15. The system of claim 14, wherein said GUI is further adapted to carry out application enabling configuration and provisioning actions.

16. The system of claim 14, wherein said virtual end-user code generator is further adapted to contain application enabling instructions, code, or files for one or more applications.

17. The system of claim 14, further comprising:
a setup package manager adapted to manage the setup package life cycle.

18. The system of claim 14, further comprising:
an enabling agent adapted to execute application specific enabling functions.

19. The system of claim 14, further comprising:
an enabling module adapted to manage enabling agents together with associated virtual application enabling setup packages.

20. The system of claim 14, wherein said virtual end-user code generator is further adapted to provide multiple application enabling virtual end-user source code generation.

21. The system of claim 14, wherein said virtual end-user code generator is further adapted to run enabling agent together with the associated virtual application enabling setup package.

22. The system of claim 14, further comprising:
a website source code generator adapted to generate a new, application enabled, version of the website source code.

23. The system of claim 14, further comprising:
a code remover adapted to remove application enabling code from the website source code.

* * * * *